Patented June 7, 1927.

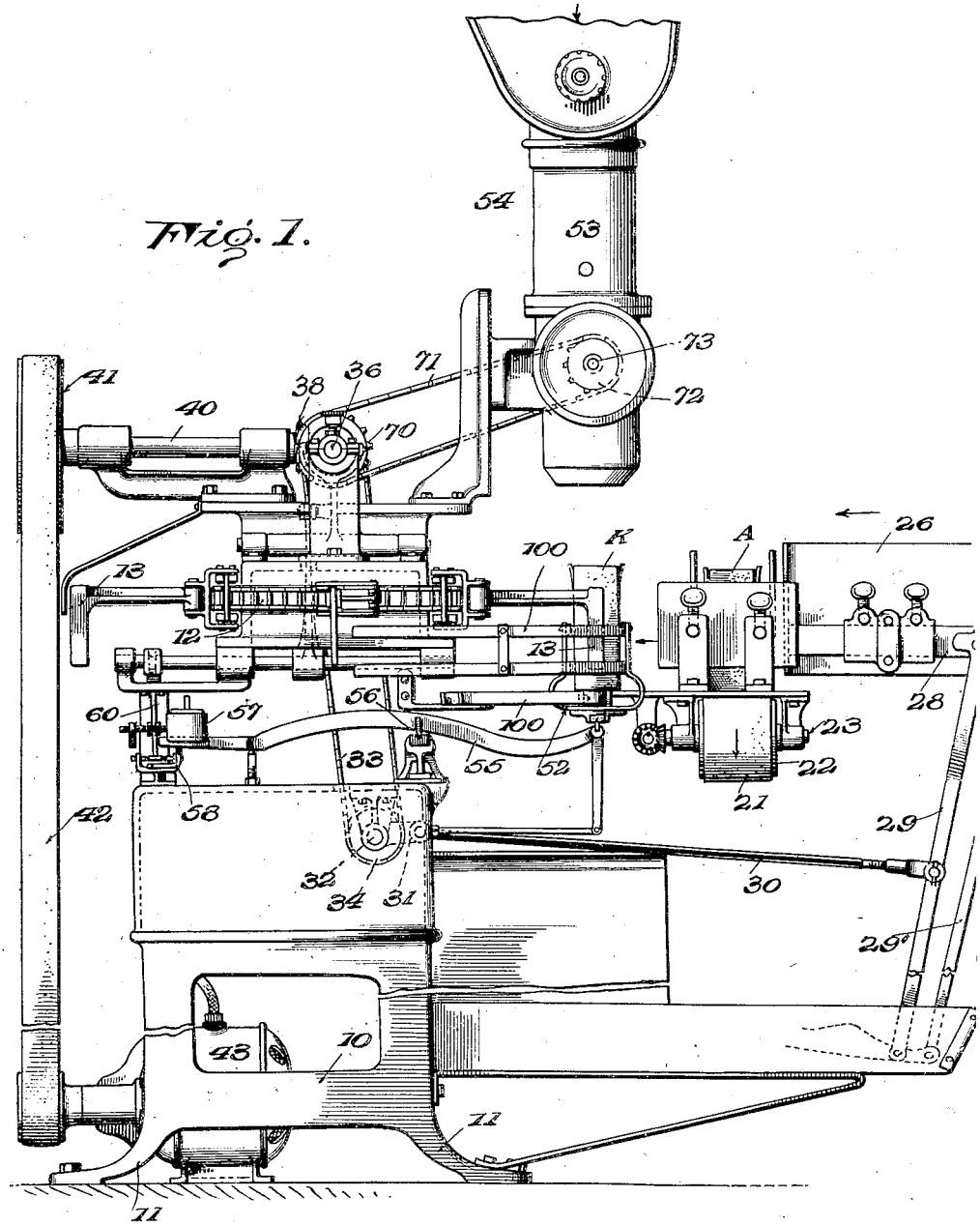

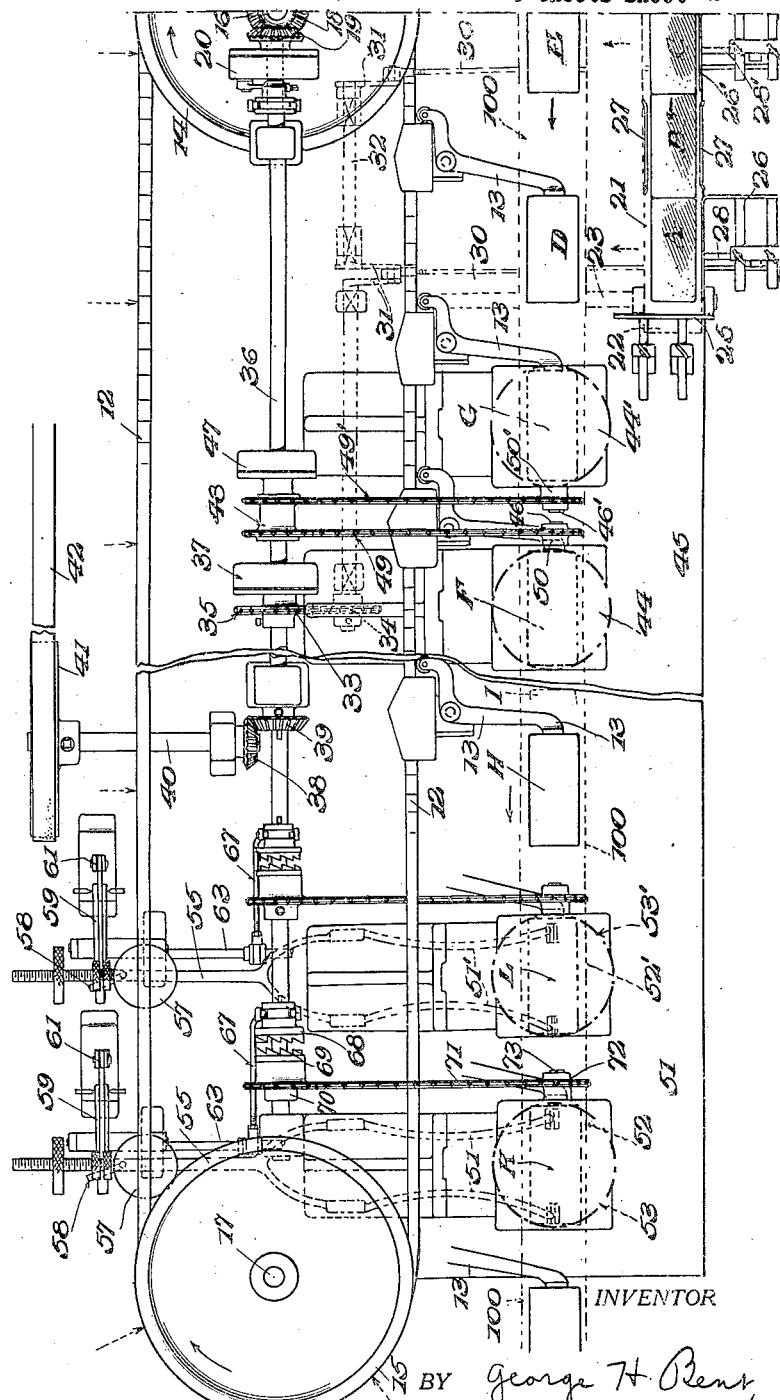

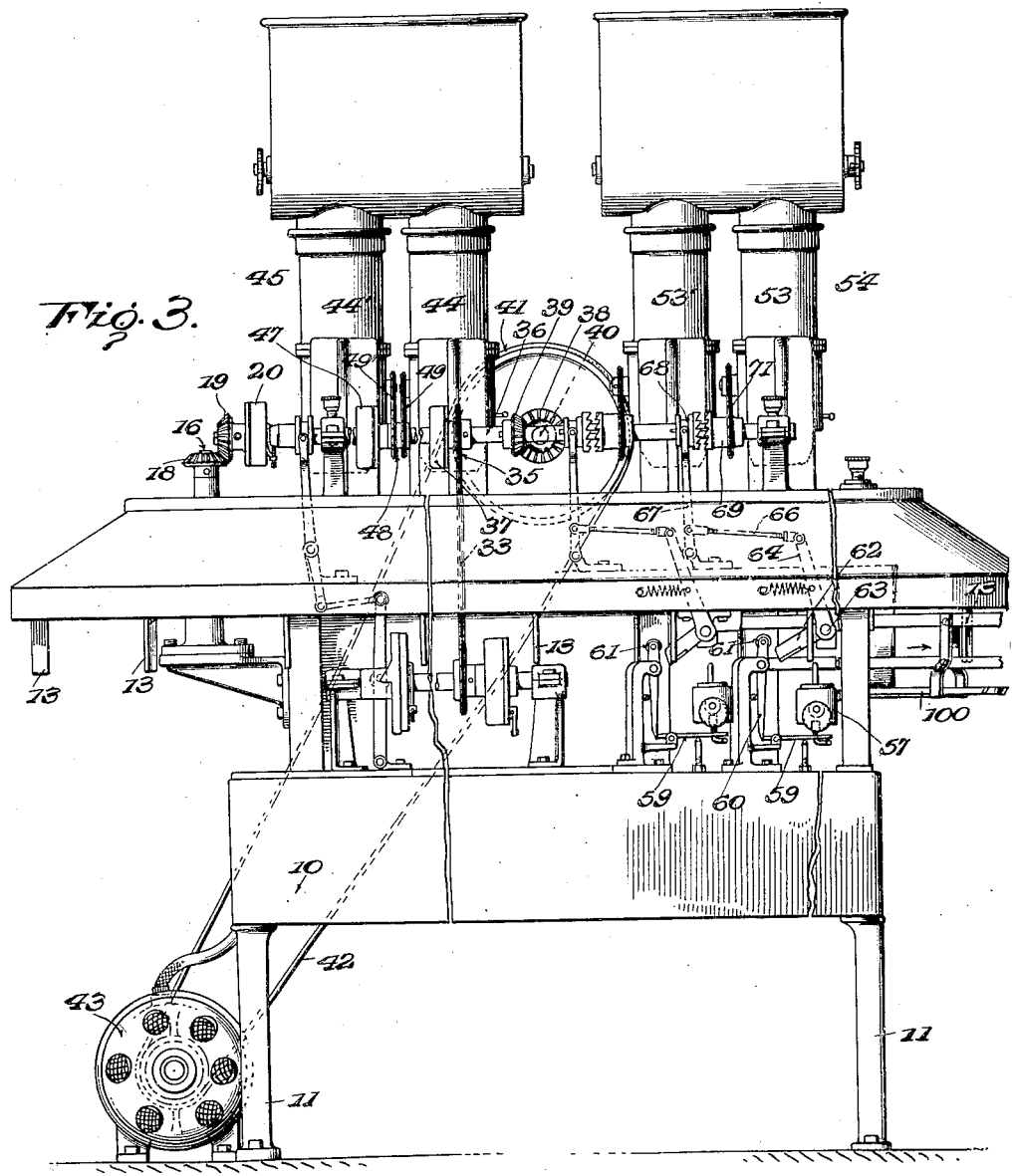

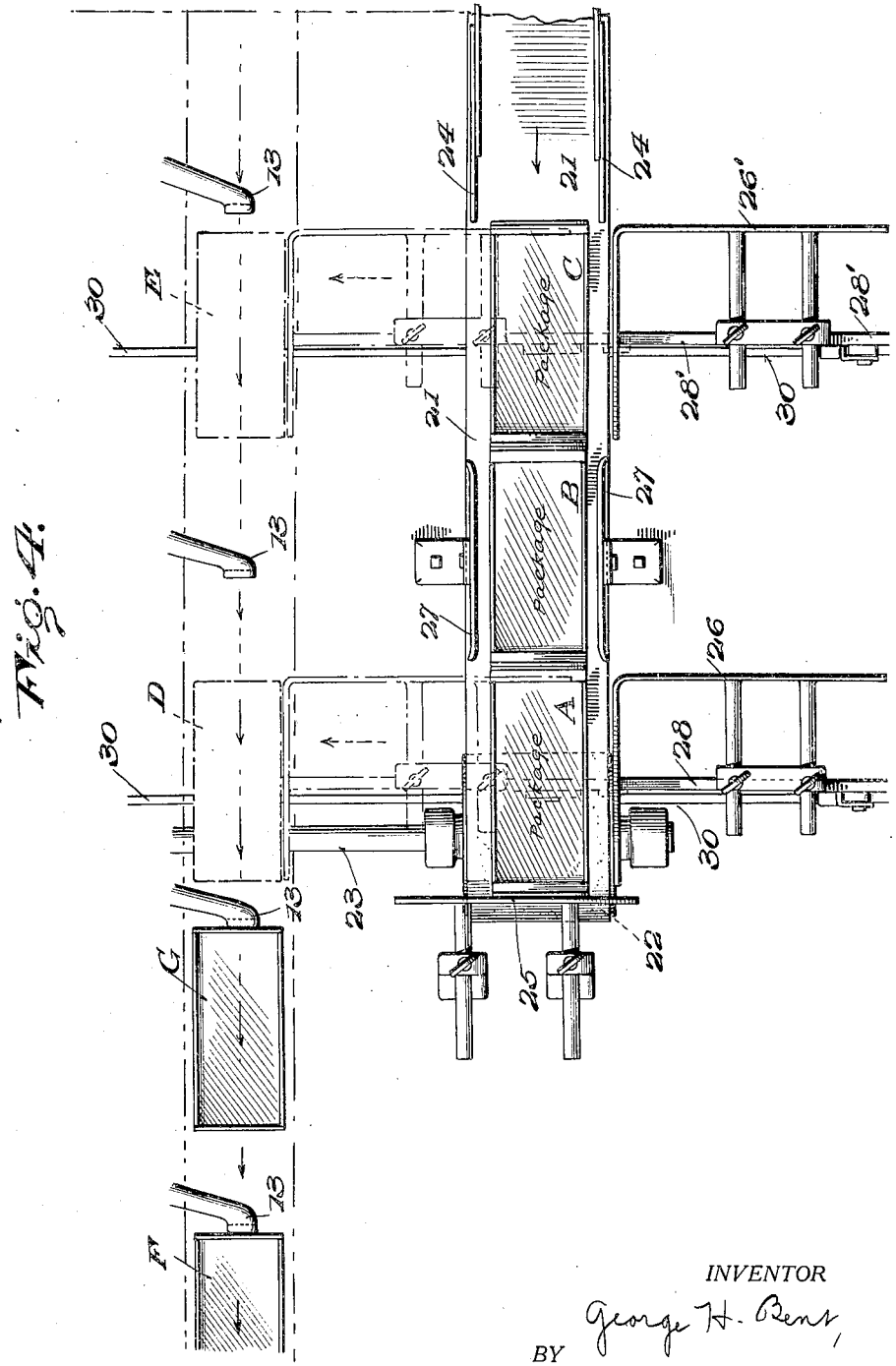

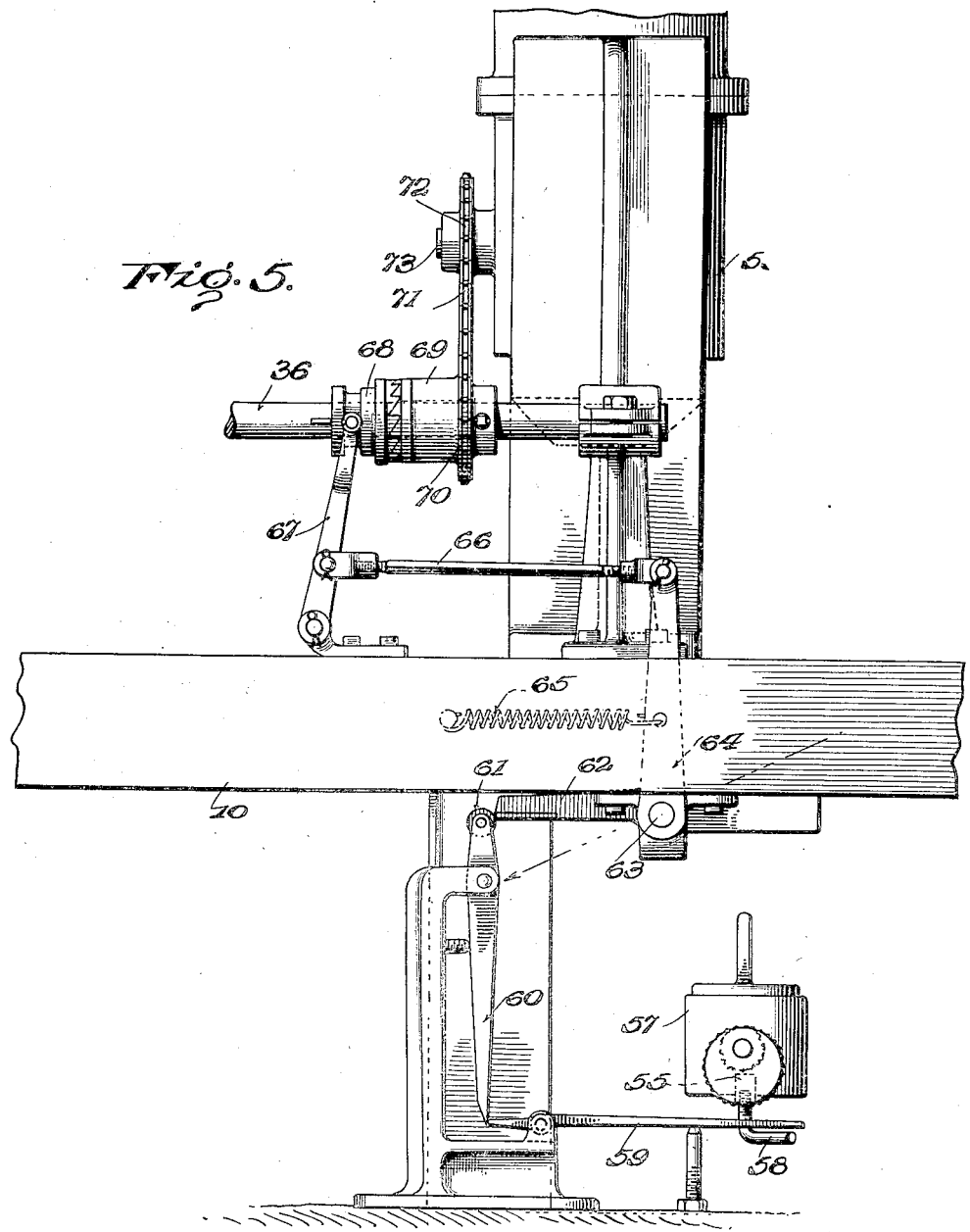

1,631,117

UNITED STATES PATENT OFFICE.

GEORGE H. BENT, OF BATTLE CREEK, MICHIGAN.

WEIGHING MACHINE.

Application filed February 26, 1924. Serial No. 695,298.

This invention relates to weighing machines, and more particularly to weighing machines of the type employed in handling, filling and weighing receptacles such as cartons or the like.

It has been the custom in weighing goods into a package to introduce a quantity of material into a package at one station of the machine either by measure or rough weight, and then to move the package onto a scale pan where an additional amount of material is put into package to bring the contents up to exact weight. Such machines have been provided with one preliminary filling station and one final weighing station and have delivered but one filled and weighed package at each complete operation of the machine.

The object of this invention is to provide a machine which weighs with great rapidity two or more packages at the same time; which fills the material directly into a group of receptacles or cartons and gross weighs the same simultaneously and independently of each other; and which directly fills successive groups of receptacles or cartons and gross weighs two or more at the same time, independently of each other and in successive groups.

This invention may receive a variety of mechanical expressions, one of which is shown in the accompanying drawings, but it is to be expressly understood that the drawings are for purposes of illustration only and are not to be construed as defining the limits of the invention, reference being had to the appended claims for this purpose.

In said drawings, Fig. 1 is an end view of the machine looking from the left of Fig. 2;

Fig. 2 is a top plan with portions of the machine removed for purposes of clearer illustration;

Fig. 3 is an elevation from the rear of the machine;

Fig. 4 is a diagrammatic detail of receptacle-handling mechanism; and

Fig. 5 is an enlarged view of scale-actuated control mechanism for filling apparatus.

Referring to the drawings, more particularly Figs. 1 to 3 inclusive, 10 designates the main frame of the machine supported by legs 11 bolted or otherwise suitably secured to a floor or other foundation. The machine is provided with a carrier-chain 12, having fingers 13 secured thereon at equal distances from each other, said chain passing around sprockets 14 and 15, secured at the upper ends of vertical shafts 16 and 17, journaled in suitable bearings upon the machine frame. Any drive mechanism may be used to move the carrier-chain, and as this operation is old, it is not described here in detail. The drive mechanism may include suitable gearing such as bevel-gears 18 and 19, and an intermittent clutch mechanism 20 of any well-known construction. In the movement of this carrier-chain, the clutch mechanism 20 rotates sprocket 14 through a sufficient distance to move the fingers 13 a predetermined number of steps each time the machine operates. As here shown, fingers 13 are moved two steps at each operation of the driving mechanism, but I do not limit myself to the exact intermittent movement here disclosed since this may be varied in accordance with the number of receptacles or cartons desired in each group.

The empty receptacles or cartons are each introduced into the carrier mechanism at predetermined intervals in groups of two or more cartons, the mechanism for this purpose being timed to operate when the carrier-chain 12 and finger 13 are at rest. Said mechanism includes an infeed belt 21 or other suitable conveyor offset from the carrier mechanism, the delivery end of said belt passing around a pulley 22 fast on a shaft 23 continuously driven from a suitable source of power, not shown. The empty receptacles or cartons are disposed in side by side relation at the delivery end of the belt 21, displacement of the cartons from the sides and end of the belt being prevented by the usual guide-rails 24 and stop or abutment 25. Said rails are interrupted at two or more points near the delivery end of the belt 21 to provide spaces for discharging the cartons laterally from said belt to the carrier mechanism of the machine.

Alternate receptacles or cartons A and C, at the delivery end of the belt (Fig. 4), are transferred simultaneously from the latter to the carrier mechanism by two or more pushers 26, 26', the intermediate receptacle B being prevented from displacement by short guide-rail sections 27. Said pushers are of general L-shaped formation, the arrangement being such that one side of each pusher prevents movement of the empty receptacles toward the delivery end of the infeed belt while a group of cartons is being transferred to the carrier mechanism. The pushers 26, 26' are adjustably mounted on horizontal rods 28, 28' and are operated through systems of links and levers which are identical for each pusher. Since the construction is the same in each case, only one set of operating means need be described. Rod 28 is pivoted to the upper ends of a pair of levers 29, 29' (Fig. 1) pivoted at their lower ends to the main frame of the machine. Said levers are oscillated by a connecting-rod 30, having one end attached to lever 29, the opposite end of said rod being mounted on one crank 31 of a crankshaft 32, journaled in suitable bearings on the machine frame-work. Said crank-shaft is driven by a chain 33 (Fig. 2) which passes around a sprocket 34 fast on crankshaft 32 and around a sprocket 35 loosely mounted on the main drive-shaft 36. Sprocket 35 is driven by an intermittent clutch 37 similar to clutch 20, the operation of clutch 37 being timed to oscillate the pusher levers so that each pusher moves an empty carton into the carrier mechanism when the latter is at rest. Shaft 36 is continuously operated by means of suitable gearing including bevel-gears 38 and 39, a short shaft 40, pulley 41 and belt 42, the latter being driven by a suitable motor 43 (Fig. 3).

The pushers 26 and 26' transfer empty cartons A and C from their positions on the belt into positions represented by cartons D and E on a way 100 located at one side of the machine (Fig. 2). It will also be seen that one carton B is left on the belt 21 and that the cartons removed from said belt are positioned in front of two successive carrier fingers 13. Upon subsequent operation of the carrier mechanism, cartons D and E are moved from their initial position on the way 100 into positions (represented by cartons F and G) below the hoppers 44, 44', of a filling unit designated broadly at 45. This filling unit may be of any well-known type and any suitable means may be employed for discharging material from the hoppers directly into the group of receptacles or cartons positioned therebelow.

A discharging device is provided for each hopper, such as a paddle-wheel, roller or the like (not shown), said devices being mounted on shafts 46, 46', journaled in suitable bearings at the lower part of the respective hoppers. Said discharging devices are driven intermittently by means of a timed clutch 47 mounted on drive-shaft 36, a double sprocket 48, loose on said shaft, and chains 49, 49' which pass around the double sprocket and around sprockets 50, 50', secured on shafts 46, 46'. Any suitable type of clutch may be employed, the construction and operation of which is well known and needs no detailed description. It will of course be understood that this mechanism is timed to operate in the interval of rest of the carrier mechanism and when the group of cartons F, G, is positioned below the hoppers as above described. This filling unit constitutes in effect what is known as a rough-load hopper, the purpose of which is to introduce material into the cartons in bulk and weight slightly below the final predetermined weight of the package.

When the group of cartons F, G has been rough-loaded as above described, the same will be moved by a subsequent operation of the carrier mechanism to intermediate positions in the machine represented by the group of cartons H, I. At the next operation of the carrier mechanism the rough-loaded group of receptacles or cartons will be moved onto a weighing unit designated broadly at 51 (Fig. 2). Said weighing unit comprises a plurality of scales, here shown as two, although a greater number may be employed if so desired. These scales 51, 51' simultaneously weigh a group of two or more packages, each independently of the other. The platforms 52, 52' of these scales are disposed in line with way 100, the latter being interrupted at suitable intervals for this purpose, so that the scale platforms in reality form parts of the way, whereby successive groups of packages may pass along the way, onto the platforms, and beyond the same to a top-sealing machine and final point of delivery.

The scale platforms are disposed below hoppers 53, 53' (Fig. 3), forming a part of a second filling unit designated broadly at 54. This hopper unit may be of any well-known construction but preferably the type employed is known as a drip-stream hopper, the purpose of which is to add sufficient material to rough-loaded receptacles or cartons whereby the exact predetermined weight of each package is obtained. Each hopper 53, 53' is provided with a material discharging device such as referred to in the above description of the rough-loading filling unit.

The group of cartons H, I, is moved by the said operation of the carrier mechanism to positions on the scale platform, indicated by cartons K, L. While the group of receptacles or cartons with the initial or rough-load of material therein is positioned on the scale platforms, final weight is introduced into each carton from said hoppers above the scales by mechanism which will be hereinafter described. When the predetermined weight has been obtained (the scales having been previously set for this purpose), each scale is tripped independently of the other and the tripping of said scales is followed by a subsequent operation of the carrier mechanism whereby the group of filled and weighed packages is simultaneously removed from the scales and the next group of rough-loaded packages is moved onto the scales.

The scale mechanism may be of any well-known construction and therefore does not require a detailed description. Each scale (Figs. 1 and 5) has the usual scale-beam 55, mounted at 56 in a knife-edge bearing and carrying at the inner end an adjustable weight 57. Scale-actuated mechanism is provided for controlling the operation of the material discharging devices in filling unit 54. A separate controlling mechanism is employed for each scale and the corresponding material discharging device, but since the operation and construction of these mechanisms are identical, only one of the same will be described. As shown, this scale-actuated mechanism is represented in a position during the weighing operation and comprises a lifting finger 58 secured to the scale weight 57 which, when the scale-beam 55 is tilted, engages and lifts a tripping lever 59 fulcrumed near its inner end on a stationary part of the machine. The lifting of said tripping lever releases a vertical trip lever 60 fulcrumed near its upper end on the machine frame and carrying a roller 61. When lever 60 is released, the bottom thereof swings to the right and the top to the left. This movement of trip lever 60 releases roller 61 from engagement with a lever 62 mounted on a rock-shaft 63, allowing lever 62 to swing downward, and moving to the left a lever 64 also secured on said rock-shaft. The leftward movement of lever 64 is further obtained by the aid of a coil-spring 65, having one end secured to said lever and the opposite end secured to the machine frame-work. Through the action of a connecting-rod 66, one end of which is attached to the upper end of lever 64 and the other end of which is attached to a clutch lever 67, the latter is caused to swing to the left and move a clutch part 68, keyed to driven shaft 36. Clutch part 68 is slidably mounted on the drive-shaft, and while free to move lengthwise thereof, rotates with it. A clutch part 69 is loosely mounted on the drive-shaft and formed with a sprocket 70. A drive-chain 71 passes around said sprocket and also around a sprocket 72 secured on the shaft 73 of a material discharging device (not shown) within the hopper. Said device is preferably of the type or types referred to as employed in filling unit 45.

While the clutch parts 68 and 69 are engaged, the material discharging device operates to deliver goods into the packages on the scale platforms, but when the scale-beams trip, the clutch parts are disengaged and operation of the material discharging device ceases until a succeeding group of rough-loaded cartons or receptacles is positioned on the scale platforms. At this time the trip mechanism is reset, and the clutch parts moved into operative engagement, through the medium of any suitable means for this purpose which preferably includes the connections above described, whereupon the material discharging devices again operate to deliver goods into the packages on the scale platforms until said packages reach a predetermined gross weight. The scales are then tripped and the material discharging devices again cease to operate until a group of gross weighed cartons has been moved off the scale platforms by the carrier mechanism and another group of rough-loaded cartons moved onto the scale platforms by said mechanism.

In the operation of the machine, the cartons are brought into position alongside the same by belt 21, and successive groups of two or more empty cartons are introduced into the carrier mechanisms 12 and 13 at predetermined intervals. The pushers 26, 26', and operating mechanisms therefor, cooperate in timed relation with the carrier to successively feed into the machine proper, groups of cartons each of which is subsequently rough-loaded at unit 45, later filled and weighed at unit 54, and then passed on to the top-sealing machine and final point of delivery. It will be noted that when a group of cartons is introduced into the carrier mechanism, a preceding group is being rough-loaded, a third group is at an intermediate position in the machine, a fourth group is being simultaneously filled and weighed, each carton independently of the other, and a fifth group is in a position for movement toward the top-sealing mechanism above referred to.

It is to be expressly understood that the invention is not limited to the handling, filling and weighing of groups of packages, two in each group. Any desired number of packages may be handled at the various stations at the same instant, and minor changes in the construction of the entire apparatus may be made to facilitate handling, filling and weighing cartons in groups of three or more at a time. Such changes are to be construed as within the scope of this invention.

What is claimed is:—

1. In an apparatus of the character described, receptacle filling means arranged in units spaced apart and each adapted to supply material to a group of receptacles, means for conveying groups of receptacles to said filling units at predetermined intervals, and means at one filling unit for weighing a group of filled receptacles independently of each other.

2. In an apparatus of the character described, receptacle filling means arranged in units spaced apart and each adapted to supply material to a group of receptacles, means for conveying groups of receptacles to said filling units at predetermined intervals, and a plurality of scales at one of said filling units for weighing a group of filled receptacles simultaneously and independently of each other.

3. In an apparatus of the character described, a rough load hopper unit and a drip stream hopper unit, said units being spaced apart and each comprising a plurality of hoppers, a plurality of scales having their platforms disposed below the hoppers of said drip stream unit, and means for conveying groups of receptacles to said rough load hoppers and scale platforms at predetermined intervals.

4. In an apparatus of the character described, a rough load hopper unit and a drip stream hopper unit, said units being spaced apart and each comprising a plurality of hoppers, a plurality of scales having their platforms disposed below the hoppers of said drip stream unit, means for conveying groups of receptacles to said rough load hoppers and scale platforms at predetermined intervals, and devices for discharging material from said hoppers timed to operate at predetermined intervals.

5. In an apparatus of the character described, a conveyor-way, a pair of hopper units spaced apart and each comprising a plurality of hoppers disposed above said way, a plurality of scales grouped together with their platforms forming parts of said way below said hoppers, means conveying groups of receptacles along said way at predetermined intervals, to positions on said scale platforms, and intermittently operated means for discharging material from said hoppers into said receptacles.

6. In an apparatus of the character described, a conveyor-way, a pair of hopper units spaced apart and each comprising a plurality of hoppers disposed above said way, a plurality of scales grouped together with their platforms forming parts of said way below said hoppers, intermittently operated means for moving a group of receptacles along said way onto said platforms, devices for discharging material from said hoppers into said group of receptacles, and scale-actuated means controlling the operation of said discharging devices.

7. In an apparatus of the character described, a rough load unit adapted to deliver material into a group of receptacles, a drip stream unit adapted to deliver material into the rough loaded group of receptacles, means for carrying the group of receptacles to said units, and means adjacent the drip stream unit for gross weighing the group of loaded receptacles independently of each other.

8. In an apparatus of the character described, receptacle filling means, a conveyor for feeding receptacles past said filling means, a receptacle infeed, and a plurality of pushers for simultaneously transferring two or more receptacles from said infeed onto said conveyor.

9. In an apparatus of the character described, means for filling a group of receptacles, intermittently driven means for conveying groups of receptacles to said filling means, a receptacle infeed, and means for transferring groups of receptacles from said infeed to said conveyor at predetermined intervals.

10. In an apparatus of the character described, a conveyor-way, an intermittently operated conveyor provided at intervals with receptacle-engaging fingers operating above said way, a receptacle infeed, and means for transferring alternate receptacles on said infeed to said conveyor-way between successive fingers of said conveyor.

11. In an apparatus of the character described, means for filling a group of receptacles, means for simultaneously and independently weighing said filled receptacles, a conveyor for feeding groups of receptacles to said filling and weighing means at predetermined intervals, a receptacle infeed, and means for transferring groups of receptacles from said infeed to said conveyor at predetermined intervals.

12. In an apparatus of the character described, a plurality of scales, a hopper disposed above the scale platforms, carrier mechanism for moving groups of receptacles onto and off of said platforms at predetermined intervals, devices timed to discharge material from said hopper into each group of receptacles when positioned on said platforms, a receptacle infeed, and means for transferring groups of receptacles from said infeed to said carrier mechanism.

13. In an apparatus of the character described, carrier mechanism, a receptacle infeed, a plurality of pushers simultaneously transferring two or more receptacles from said infeed to said carrier mechanism, a driven crank shaft, and operative connections between said pushers and the cranks of said shaft.

14. In an apparatus of the character described, an endless carrier provided at suitable intervals with receptacle-engaging fingers, an offset receptacle infeed, a plurality of pushers spaced for engagement with alternate receptacles on said infeed belt, and operating means for said pushers whereby the same are caused to move alternate receptacles on said infeed between successive fingers of said carrier.

15. In an apparatus of the character described, means for handling groups of cartons in succession, means successively rough loading said groups of cartons, means for successively weighing the groups of cartons, each group simultaneously, and means for filling the cartons of successive groups to a predetermined weight.

16. In an apparatus of the character described, means for handling groups of cartons, in succession, means successively rough loading said groups of cartons, means for successively weighing the groups of cartons, each group simultaneously and the cartons independently, and means for filling the cartons of successive groups to a predetermined weight.

17. The method of filling and weighing cartons which consists in filling material directly into successive groups of cartons at one station, moving said cartons successively in groups to a second station, and gross weighing the groups of filled cartons in succession at the second station, each group simultaneously and the cartons independently.

18. The method of filling and weighing cartons which consists in gross-filling material directly into successive groups of cartons, moving said cartons successively in groups to a second filling station, and gross weighing the cartons of each group simultaneously and independently at said station.

19. The method of filling and weighing cartons which consists in rough-loading material directly into successive groups of cartons at one station, moving said cartons successively in groups to a second filling station, and gross weighing the cartons of each group simultaneously and independently of each other at said second station by adding material to each carton sufficient to produce a predetermined gross weight thereof.

20. The method of filling and weighing, which consists in rough loading a group of receptacles at one station, moving the rough loaded group of receptacles to a second station, and finally loading, and gross weighing the group of receptacles independently of each other at said second station.

In testimony whereof I have signed this specification.

GEORGE H. BENT.